United States Patent
Christensen et al.

(10) Patent No.: US 9,015,947 B2
(45) Date of Patent: Apr. 28, 2015

(54) METHOD AND DEVICE FOR LOCKING TIRES

(75) Inventors: Tom Christensen, Spånga (SE); Niklas Lilja, Kungsängen (SE)

(73) Assignee: Nitotec Sweden Aktiebolag, Spanga (SE)

( * ) Notice: Subject to any disclaimer, the term of this patent is extended or adjusted under 35 U.S.C. 154(b) by 447 days.

(21) Appl. No.: 12/908,245

(22) Filed: Oct. 20, 2010

(65) Prior Publication Data

US 2012/0097309 A1 Apr. 26, 2012

(51) Int. Cl.
*B29D 23/24* (2006.01)
*B60C 17/01* (2006.01)
*B60C 19/12* (2006.01)
*B60C 29/06* (2006.01)

(52) U.S. Cl.
CPC ............ *B60C 17/01* (2013.01); *B60C 19/12* (2013.01); *B60C 29/062* (2013.04)

(58) Field of Classification Search
USPC ........ 29/894.34, 894.3, 450, 454, 507, 221.5, 29/815, 22; 156/115; 152/340.13, 339.1, 152/341.1, 342.1, 399–401
See application file for complete search history.

(56) References Cited

U.S. PATENT DOCUMENTS 1,307,173 A * 6/1919 Anthony ................ 156/115
4,071,386 A * 1/1978 Gomberg ............... 156/113

FOREIGN PATENT DOCUMENTS

DE 2806325 A1 8/1979
EP 0695651 A1 2/1996

* cited by examiner

*Primary Examiner* — Christopher Besler
(74) *Attorney, Agent, or Firm* — Young & Thompson

(57) ABSTRACT

A method for locking a tire to a wheel rim, includes the steps of mounting a tubular tire locking element on the wheel rim, which tubular locking member is arranged with a valve, which valve is pushed through a hole in the rim; mounting a tire on the rim such that the tire encloses the tubular tire locking element and a pressure chamber is obtained between the tire locking element and the tire; pressurizing the tubular tire locking element via the valve such that it expands, whereby the beads of the tire are pressed against the flanges of the wheel rim; inserting a hollow needle through the tire and into the pressure chamber, which hollow needle is connected to a pressurized air source; pressurizing the pressure chamber to desired pressure, removing the hollow needle; and sealing the hole caused by the needle with sealing fluid or plug.

5 Claims, 1 Drawing Sheet

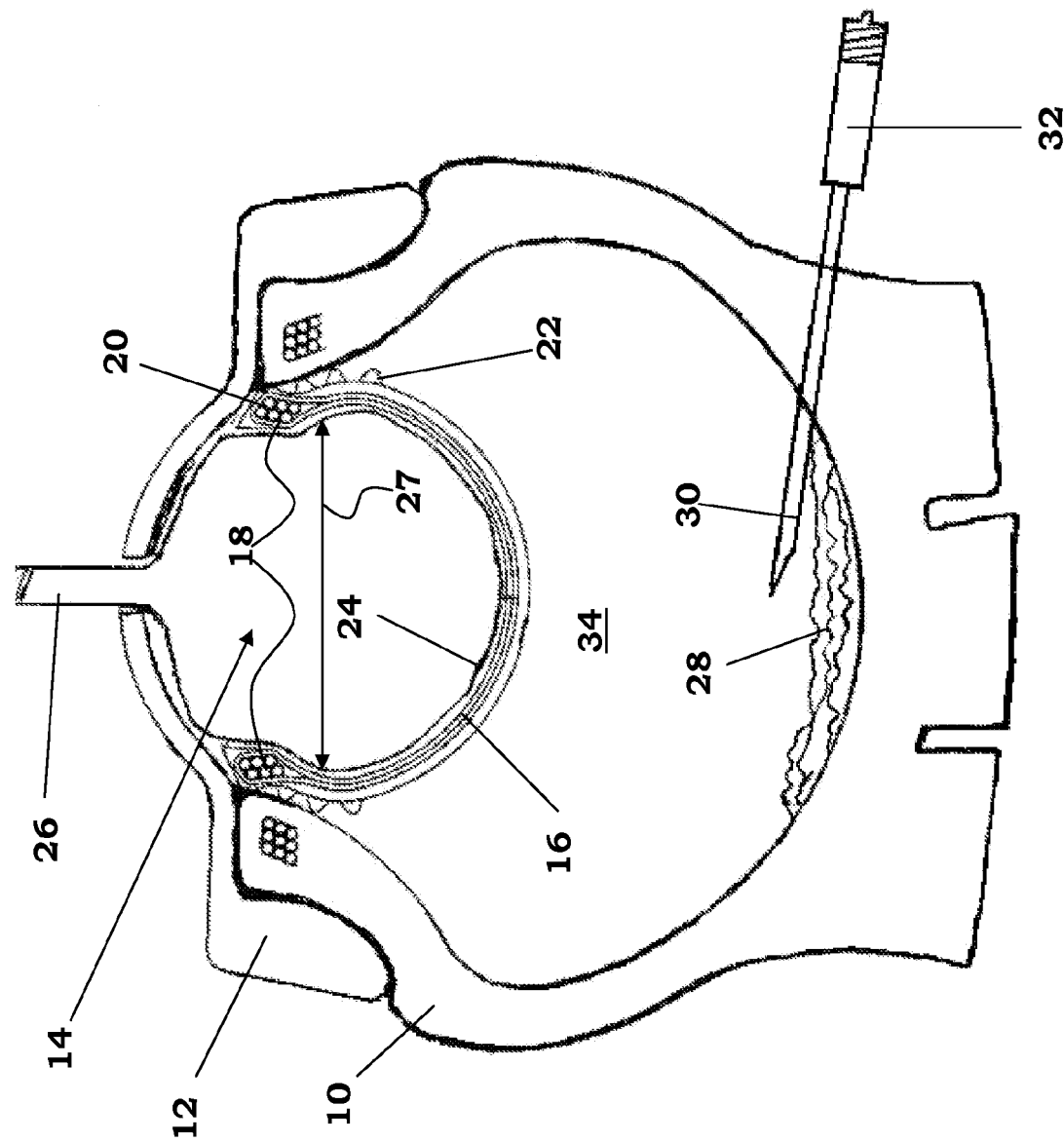

METHOD AND DEVICE FOR LOCKING TIRES

TECHNICAL AREA

The present invention relates to a locking element intended to be attached to a rim inside a tyre, whereby the rim comprises two flanges on either side of a base and whereby the flanges surround the tyre edges. The locking element is adjustable between a locking position and a free position, whereby it is intended to extend around the rim and lock the tyre against the rim flanges in its locking position.

TECHNICAL BACKGROUND

During for example motor cross it is sometimes desirable to have a lower pressure in the tyres than what is normal for driving on roads. This puts other demands on rims and tyres. During low pressures the tyre becomes more sensitive for hits and other external impacts. On the one hand the low pressure means that the tyre is less attached to the rim, because normally it is the air pressure that presses the tyre beads against the rim flanges. Moreover the low pressure leads to that the tyre may be squeezed and sometimes punctured between the rim flange and the surface. A punctured tyre may also lead to the risk of the tyre being wrought off the rim, whereby the motorcycle is not drivable any more. For safety and competition reasons it might for some situations be necessary to wait with changing of tyres and to continue the driving despite a punctured tyre. It would therefore be desirable to have a device that enables loads on the tyre even if the tyre has been punctured.

EP 0 695 651 discloses a device for locking a tyre to a rim. It comprises a tubular member that is placed inside the tyre having a diameter such that it is in the vicinity of the beads. It is further arranged with a valve protruding through a hole in the rim, for inflating the tubular member. When this is done, the tubular member will press against the beads, which in turn press against the flanges of the rim.

The drawback with the device according to EP 0 695 651 is that the rim needs two holes for valves, one for the tubular member and the other for the tyre. Further, an airtight band is required, abutting the inner surface of the rim for preventing air from escaping through the rim. In all, the device is difficult to attach to a rim, to arrange the tubular member in the right position and to inflate both the tyre and the locking member.

Document DE2806325 discloses a method according to the preamble of claim 1.

BRIEF DESCRIPTION OF THE INVENTION

The aim of the present invention is to provide a method for locking a tyre to a rim in a convenient and safe way with few components.

This aim is obtained by the features of the independent patent claims. Preferable embodiments of the invention form the subject of the dependent claims.

According to a main aspect of the invention it is characterised by a method for locking a tyre to a wheel rim, comprising the steps of mounting a tubular tyre locking means on the wheel rim, which tubular locking member is arranged with a valve, which valve is pushed through a hole in the rim, mounting a tyre on the rim such that the tyre encloses the tyre locking means and a pressure chamber is obtained between the tyre locking means and the tyre, pressurizing said tyre locking means via said valve such that it expands, whereby the beads of the tyre are pressed against the flanges of the wheel rim, inserting a hollow needle through the tyre and into said pressure chamber, which hollow needle is connected to a pressurized air source, pressurising said pressure chamber to desired pressure, removing said hollow needle, and sealing the hole caused by said needle.

According to another aspect of the invention, it comprises the step of introducing a sealing liquid in said pressure chamber before the tyre is completely mounted on the wheel rim, whereby said sealing liquid flows into and seals the hole caused by said needle when said needle is removed.

According to a variant, the sealing of said hole comprises inserting and attaching a sealing plug.

According to another aspect of the invention, it is characterised by a tyre locking kit for performing the method according to the above method, comprising a tubular tyre locking means arranged with a valve and intended to be mounted on the wheel rim and when in an inflated state press the beads of a tyre against the flanges of a wheel rim, thereby locking the tyre against the rim, a hollow needle intended to penetrate the tyre, and arranged to be connected to a pressurized air source for inflating said tyre, and tyre hole sealing means.

According to a further aspect of the invention, the tyre hole sealing means comprises a container with sealing liquid intended for sealing holes in tyres.

According to a variant of the tyre locking kit, the tyre hole sealing means comprises a sealing plug intended to be inserted in holes in tyres.

According to another aspect of the invention, said tubular locking means comprises an annular lock member having a semi-circular cross-section, the side surfaces of which are intended to abut the beads of the tyre, and a tube comprising said valve, arranged to be positioned inside said annular lock member, which tube, when inflated, is arranged to expand generally in its transversal direction.

According to yet an aspect of the invention, said annular lock member further comprises annularly extending reinforcement means, capable of preventing expansion of said lock member in its longitudinal direction.

According to a further aspect of the invention, said annular lock member comprises annular ledges on the side surfaces, providing airtight seal between the beads of the tyre and the tyre locking means, when inflated.

The advantages with the present invention are several. The tyre locking means provide a very firm and positive locking of the beads of the tyre against the flanges of the rim. Because the tyre locking means comprises a tube with an air valve, the normal air valve hole of the rim can be used.

However, since the present invention utilizes a hollow needle, which penetrates the tyre, no further air valve for inflating the tyre is needed. Also the overall design of the tyre locking means provides device with less components and/or requires less modification of rims and/or tyres, which in turn simplifies the mounting and also means a lighter device that is of importance especially for motorcycles.

The sealing of the hole after the needle may be done by a sealing liquid poured inside the tyre or with a sealing plug that is inserted into the hole. The advantage with the sealing liquid is that it may provide a sealing layer on the whole inner surface of the tyre.

Preferably the lock member is designed such that it provides an airtight seal between the tyre locking means and the beads of the tyre and is further arranged with reinforcement means preventing expansion in its longitudinal direction and only expansion of the tyre locking means in its transversal direction.

These and other aspects of and advantages with the present invention will become apparent from the following detailed description and from the accompanying drawing.

BRIEF DESCRIPTION OF THE DRAWINGS

In the detailed description of the invention, reference will be made to the accompanying drawing, of which FIG. 1 is a cross-sectional view of a tyre and a rim and comprising the present invention.

DETAILED DESCRIPTION OF THE INVENTION

FIG. 1 is a cross-sectional view of a motorcycle tyre 10 mounted on a rim 12. A tyre locking means is denoted with 14. It comprises an annular lock member 16 having a semi-circular cross-section such that two bead-shaped sections 18 are formed. The bead-shaped sections are preferably provided with reinforcement means 20 such as steel wires, which prevent expansion in its longitudinal direction, as will be described below. The outer surfaces of the beads are arranged with annularly extending ridges or ledges 22, the function of which will be described below. Inside the annular lock member a tube 24 of an elastic material, such as rubber, is arranged. The tube is arranged with a valve 26 for inflating it, which valve extends through a hole in the rim.

The tyre locking device is intended to function as follows. The locking member 16 and the tube 24 are mounted as a unit, i.e. with the tube inside the locking member, on the rim 12. This is done in a conventional manner in that one of the beads of the locking member is brought into the bottom of the drop centre of rim and then the other bead is pushed over the edge of the rim flange. After this the tyre is mounted on the rim, also in a conventional manner. However, before the other bead of the tyre is pushed over the edge of the rim flange a sealing fluid 28 is poured into the interior of the tyre.

When the tyre is mounted on the rim, the tube of the tyre locking means is pressurised via the valve 26. This inflates the tube whereby it expands mainly in its transversal direction as is shown by arrow 27, which in turn causes the locking member to expand in its transversal direction. The reinforcement wires 20 prevent expansion in the longitudinal direction. The expansion in the transversal direction causes the tyre beads to be pressed against the rim flanges causing the tyre to be locked to the rim by friction. The ledges 22 are pressed against the inner surface of the beads, whereby an airtight connection is obtained between the tyre locking means and the tyre beads. The pressure in the tube of the tyre locking means should always exceed the intended pressure in the tyre.

The next step is to pressurize the tyre. This is obtained by utilizing a hollow needle 30 having a sharp front end and a valve 32 in the rear end. The needle is pushed through the material of the tyre so that the front end is positioned in a pressure chamber 34 formed by the interior of the tyre and the locking means. Then a suitable pressure source is attached to the valve of the needle and the tyre is inflated to the desired pressure. After this the needle is removed. The wheel is then rotated so that the hole after the needle is positioned downwards, whereby sealing fluid 28 flows into the hole and seals it. After a shorter drying period, the tyre is ready to be used. The wheel may be rotated such that the sealing liquid forms a sealing layer on the whole inner surface of the tyre.

As a variant to sealing liquid, a sealing plug may utilized. The sealing plug is preferably of the same material as the tyre and is introduced into the hole with a suitable insertion device. The sealing plug may either be glued in the hole or be of a self-vulcanizing material.

The invention has been described in connection with a motorcycle tyre but it is to be understood that it may be utilized on all types of vehicles where there is a risk for punctures and where there is a need to move the vehicle before the puncture is taken care of, without the risk of the tyre being wrought off the rim. Examples of vehicles are bicycles, mopeds, cars, trailers, busses, lorries, construction equipment, etc.

It is to be understood that the embodiments described above and shown in the drawings are to be regarded only as non-limiting examples of the present invention and that it may be modified in many ways within the scope of protection of the independent patent claims. For the sake of clarity, the wording longitudinal direction is to mean the annular direction of a ring-shaped member and the wording transversal direction is a direction 90 degree to the former.

The invention claimed is:

1. A tire locking kit, comprising:
   an annular lock member having a semi-circular cross-section and two bead-shaped sections formed on opposite sides of the cross-section, said lock member configured to be mounted on a wheel rim such that said bead-shaped sections are in contact with inner surfaces of a tire mounted on said wheel rim;
   annularly extending ridges arranged on outer surfaces of each bead-shaped section;
   an elastic tube with a valve arranged thereon, said elastic tube configured to be placed within an interior of said lock member and, said elastic tube, when in an inflated state, expanding in a transversal direction that is transverse to the cross-section and expands said annular lock member in the transversal direction such that the bead-shaped sections with the ridges press beads of said tire against flanges of the wheel rim, thereby locking the tire against the wheel rim;
   a hollow needle configured to penetrate the tire, and further configured to be connected to a pressurized air source for inflating said tire; and
   a container with sealing liquid suitable for sealing a hole in the tire.

2. A method for locking a tire to a wheel rim, comprising the steps of:
   providing an annular lock member having a semi-circular cross-section and two bead-shaped sections form on opposite sides of the cross-section, and mounting said lock member on a wheel rim, said bead sections having annularly extending ridges provided thereon;
   mounting an elastic tube inside the lock member, said elastic tube equipped with a valve that is pushed through a hole in the wheel rim;
   pressurizing the elastic tube via said valve such that the elastic tube inflates and expands in a transversal direction transverse to said cross-section, and such that said pressurizing causes said annular lock member to expand in the transversal direction so that the bead-shaped sections with the ridges press the beads of said tire against flanges of the wheel rim, thereby locking the tire against the wheel rim;
   inserting a hollow needle through a material of the tire into an interior pressure chamber of the tire, said hollow needle being connected to a pressurized air source;
   pressurizing said pressure chamber to a predetermined pressure;
   removing said hollow needle; and
   sealing a hole in the material of the tire caused by said needle.

3. The method according to claim 2, further comprising:
introducing a sealing liquid (28) in said pressure chamber (34) before the tire (10) is completely mounted on the wheel rim (12), whereby said sealing liquid (28) flows into and seals the hole caused by said needle (30) when said needle is removed.

4. The method according to claim 2, wherein the sealing of said hole comprises inserting and attaching a sealing plug into the hole caused by said needle.

5. A tire locking kit, comprising:
an annular lock member having two opposite ends and arranged into a semi-circular shape with a semi-circular cross-section that encloses an interior, and interior-facing surfaces of the opposite ends arranged to face each other, each of said opposite ends having a bead-shaped section formed thereon, said lock member configured to be mounted on a wheel rim such that said bead-shaped sections are in contact with inner surfaces of a tire mounted on said wheel rim;

annularly extending ridges arranged on outer-facing surfaces of each bead-shaped section of said lock member;

an elastic tube with a valve arranged thereon, said elastic tube located inside the interior of said lock member, said elastic tube being inflatable to expand in a transversal direction that is transverse to the cross-section, said elastic tube being configured and arranged within said interior such that, when in an inflated state, the elastic tube presses against said annular lock member in the transversal direction such that the bead-shaped sections and the ridges thereof press against beads of the tire and thereby press said beads of the tire against flanges of the wheel rim, thereby locking the tire against the wheel rim;

a hollow needle configured to penetrate through a thickness of the tire and into an interior pressure chamber of the tire, an end of the hollow needle being connectable to a pressurized air source for inflating the tire; and a container with sealing liquid suitable for sealing a hole in the tire.

* * * * *